US007005765B1

(12) United States Patent
Schulz et al.

(10) Patent No.: US 7,005,765 B1
(45) Date of Patent: Feb. 28, 2006

(54) LIQUID-COOLED ELECTROMOTOR

(75) Inventors: Rudolf Schulz, Weiz (AT); Markus Frickh, Golling (AT); Ewald Hörz, Weiz (AT)

(73) Assignee: Elin EBG Motoren GmbH, Weiz (AT)

( * ) Notice: Subject to any disclaimer, the term of this patent is extended or adjusted under 35 U.S.C. 154(b) by 43 days.

(21) Appl. No.: 10/363,847

(22) PCT Filed: Sep. 11, 2001

(86) PCT No.: PCT/EP01/10474

§ 371 (c)(1),
(2), (4) Date: Mar. 13, 2003

(87) PCT Pub. No.: WO02/23699

PCT Pub. Date: Mar. 21, 2002

(30) Foreign Application Priority Data

Sep. 14, 2000 (DE) ................................ 100 45 424

(51) Int. Cl.
*H02K 9/20* (2006.01)

(52) U.S. Cl. ......................... 310/54; 417/350; 310/64

(58) Field of Classification Search ................ 310/52, 310/54, 58, 64; 417/350, 351, 357, 366
See application file for complete search history.

(56) References Cited

U.S. PATENT DOCUMENTS

| | | | |
|---|---|---|---|
| 3,371,613 A | | 3/1968 | Dahlgren et al. ............. 310/54 |
| 4,700,092 A | | 10/1987 | Bincoletto .................... 310/54 |
| 5,034,638 A | * | 7/1991 | McCabria ..................... 310/54 |
| 5,181,837 A | * | 1/1993 | Niemiec ...................... 417/350 |
| 5,185,544 A | * | 2/1993 | Takada ......................... 310/58 |
| 5,320,501 A | * | 6/1994 | Langosch et al. ............ 417/415 |
| 5,616,973 A | * | 4/1997 | Khazanov et al. ............ 310/54 |
| 5,689,994 A | * | 11/1997 | Nagai et al. ................ 74/89.32 |
| 6,222,289 B1 | * | 4/2001 | Adames ........................ 310/54 |
| 6,239,518 B1 | * | 5/2001 | Matsubara et al. ........... 310/58 |
| 6,633,098 B1 | * | 10/2003 | Inaba et al. ................... 310/58 |

FOREIGN PATENT DOCUMENTS

EP 0447215 9/1991

OTHER PUBLICATIONS

English Language Translation of International Preliminary Examination Report, conducted in the International Application No. PCT/EP01/10474.
International Search Report mailed Jun. 20, 2002, conducted in the International Application No. PCT/EP01/10474. And the Annex to the International Search Report (in English).

\* cited by examiner

*Primary Examiner*—Darren Schuberg
*Assistant Examiner*—Nguyen Hanh
(74) *Attorney, Agent, or Firm*—Greenblum & Bernstein, P.L.C.

(57) ABSTRACT

A liquid-cooled electric motor with a motor shaft, with two bearing plates which are mounted on the end faces of the motor housing and which carry on each side at least one bearing, the motor shaft being mounted rotatably in the bearings, and with at least one rotating hydraulic pump, the drive shaft of which is connected to the motor shaft by way of a coupling and which is driven by the electric motor. The casing of the motor housing receives a cooling liquid, has an at least partially hollow design and forms a casing cavity. At least one connecting duct for the supply of cooling liquid from the casing cavity to the bearings for cooling and lubrication of the bearings is provided in each of the bearing plates and in that said flanged-on hydraulic pump is sealed off in a liquid-tight manner with respect to the bearing plate interiors.

50 Claims, 4 Drawing Sheets

LIQUID-COOLED ELECTROMOTOR

CROSS-REFERENCE TO RELATED APPLICATIONS

The present application is a National Stage Application of International Application No. PCT/EP01/10474, filed Sep. 11, 2001. Further, the present application claims priority under 35 U.S.C. § 119 of German Patent Application No. 100 45 424.0 filed on Sep. 14, 2000.

BACKGROUND OF THE INVENTION

1. Field of the Invention

The present invention relates to a liquid-cooled electric motor, with a motor shaft, two bearing plates which are mounted on the end faces of the motor housing and which carry on each side at least one bearing. The motor shaft is mounted rotatably in said bearings, and the motor also includes at least one rotating hydraulic pump, for example an axial-piston, vane or gear pump, the drive shaft of which is connected to the motor shaft by way of a coupling and which is driven by the electric motor. The present invention also relates to a corresponding method.

2. Discussion of Background Information

U.S. Pat. No. 5,181,837 and U.S. Pat. No. 5,320,501 disclose electric motors according to the preamble of the present invention. Both patent specifications show an electric motor which is connected on one side or on both sides to a hydraulic pump and which drives the latter. The hydraulic fluid is in this case supplied via an inlet orifice on the housing of the motor or via a bearing plate and flows through the entire housing, thus also surrounding the stator and the rotor of the electric motor, and lubricates the bearing points and the connection between motor shaft and pump shaft. In these versions, the pumps suck in the hydraulic fluid directly from the motor space.

The motor housing and the bearing plates are designed for a special type of pump, that is to say can be used only as a fixed combination of a motor with a pump.

Since the hydraulic fluid comes directly into contact with the electric motor, the latter has to satisfy special structural and electrical requirements. On the one hand, it must, of course, be designed to be electrically insulated, and, on the other hand, it must ensure the unimpeded throughflow of the hydraulic fluid, thus obviously directly increasing the outlay and costs in production terms.

Moreover, the losses of the electric motor are, of course, increased due to an appreciably higher rotational resistance, since it has to run completely in the hydraulic fluid.

SUMMARY OF THE INVENTION

The aim of the present invention is to provide an electric motor which possesses an efficient cooling of the windings of the motor and which at the same time also ensures the cooling of the bearings.

The invention provides that the casing of the motor housing for receiving a cooling liquid has an at least partially hollow design and forms a casing cavity. At least one connecting duct for supplying cooling liquid from the casing cavity to the bearings is provided in each of the bearing plates.

Since the cooling liquid is led from the casing cavity to the bearing points via the connecting ducts, a cooling circuit is obtained which cools the electric motor and at the same time can also cool the bearing points. This cooling circuit can be operated, completely uncoupled from hydraulic circuits of the hydraulic pumps, with the result that constant cooling independently of these other hydraulic circuits can be achieved. In particular, there is consequently independence from the instantaneous conveying volume of hydraulic pumps connected to the electric motor. Moreover, it is conceivable that, in this version, the cooling circuit is maintained even in the case of a vertical electric motor.

A particularly simple embodiment is obtained when an inlet orifice for cooling liquid, connected to a coolant reservoir, is provided on the cylindrical part of the motor housing, said inlet orifice being connected to the casing cavity, and when an outlet orifice for cooling liquid, connected to a coolant reservoir, is arranged on the cylindrical part of the motor housing and is connected to the casing cavity. The cooling liquid can thus be supplied and discharged centrally, and there is easy access to the inlet and outlet orifices.

A simple alternative to this is to arrange in at least one bearing plate at least one inlet and/or outlet orifice for cooling liquid which is connected to the connecting duct.

For this purpose, it is advantageous to provide in the casing cavity at least three ducts through which the cooling liquid is capable of flowing. It is particularly advantageous to arrange the individual ducts in the casing cavity next to one another and to separate them from one another only by way of partitions, so that cooling liquid can flow essentially through the entire casing cavity. Since cooling liquid flows through the entire casing cavity, maximum cooling capacity is afforded, and the electric motor is cooled uniformly over the entire circumference.

A highly advantageous embodiment is obtained when the cooling liquid flows in series first through one bearing plate, then through part of the casing cavity, then through the second bearing plate and thereafter through the rest of the casing cavity, since this design variant can be implemented in a very simple way in structural terms.

When the interior of the motor housing, in which the electric motor is arranged, is sealed off relative to the cooling liquid by way of a seal, preferably a contactless seal, this ensures that the cooling liquid does not flow through the motor space, and the electric motor consequently runs completely in air. This necessarily results in higher efficiency, as compared with an electric motor which, for example, would run in the cooling liquid, since the rotational resistance is substantially lower. Moreover, commercially available motor components can be used, since these do not have to be specially insulated with respect to the cooling liquid, thus, of course, appreciably reducing the costs of an electric motor according to the invention.

A particularly compact embodiment is obtained when the motor shaft has, at at least one of its ends, a part of a coupling via which the drive shaft of the hydraulic pump can be connected to the motor shaft, and the bearing plate surrounds at least that part of the coupling which is located on the motor shaft, and that end face of the bearing plate which faces away from the motor housing has a flange. This affords the precondition for connecting, for example, a hydraulic pump to the electric motor in a very simple way.

A further structural advantage arises when the bearing plate of a side of the electric motor on which no hydraulic pump is flanged on is closed in a liquid-tight manner by way of a closing plate, since the same bearing plate can then be used on both sides of the motor, thus additionally reducing the production costs.

It proves to be particularly beneficial when the cooling liquid has a lubricating action, since it can then be utilized directly also for lubrication. A structural advantage arises from this when the coupling connections between the electric motor shaft and the drive shaft of the hydraulic pumps and the bearings of the electric motor shaft are arranged and designed in such a way that they can be lubricated by the cooling liquid flowing through. There is therefore no need for any additional structural measures in order to lubricate the couplings and the bearings. In particular, no grease-lubricated bearings are required and maintenance in terms of the lubrication, of the bearings and/or of the coupling may be dispensed with.

A particularly advantageous version is obtained when the adapter rings and the couplings are exchangeable and therefore can be adapted to various types of hydraulic pumps. It is consequently possible to operate different types of hydraulic pumps, even from different manufacturers, on the same electric motor simply by an exchange of two simple and inexpensive components, without structural changes to the electric motor being carried out, with the result that the choice of hydraulic pump is no longer tied to a specific manufacturer or type, but a flexible choice can be made according to price and intended use. A particularly simple coupling is obtained when the coupling is designed as a toothed sleeve. These are standardized, have a small overall size, can be produced in a simple way, are easily exchangeable and, in comparison with other coupling types, such as, for example, an elastic coupling, are highly advantageous.

It proves advantageous when a device for cooling the cooling liquid, for example an oil/water heat exchanger, is provided upstream of the entry into the casing cavity of the motor housing and a device for filtering the cooling liquid is provided downstream of the exit from the casing cavity. As a result of the filtering, possible impurities are removed from the cooling liquid, with the result that, for example, a blockage of the connecting ducts in the electric motor can be prevented. By virtue of an external cooling of the cooling liquid, a substantially more effective cooling circuit and, as a direct consequence thereof, better cooling of the electric motor are obtained.

It is particularly beneficial when the hydraulic fluid can be used at the same time as cooling liquid, with the result that the costs of operating such an assembly are reduced. This effect is further assisted when the cooling liquid and the hydraulic fluid can be extracted from a common liquid reservoir.

When a hydraulic pump for maintaining the hydraulic circuit necessary for cooling and lubricating the electric motor is flanged on on one side of the electric motor and is driven by the latter, a highly advantageous embodiment is obtained, since there is no need for a specific electric motor for driving the hydraulic pump of the cooling circuit. If, in contrast to this, a separate hydraulic motor with a specific drive is provided for maintaining the hydraulic circuit necessary for cooling and lubricating the electric motor, the cooling circuit can be maintained independently of the electric motor, that is to say, for example, cooling can be carried out even when the electric motor is stationary, and the entire electric motor power can be used for the actual hydraulic circuits.

It is particularly advantageous to provide on the bearing plates feet which carry the electric motor and the hydraulic pumps and by way of which the electric motor can be fastened to a base, since the entire assembly, that is to say the electric motor and the flanged-on hydraulic pumps, thus becomes more rigid as an overall unit. Consequently, vibrations which possibly occur can be reduced and, at the same time, the generation of noise can also be decreased.

The invention also provides for a liquid-cooled electric motor comprising a motor shaft, a motor housing and a bearing plate mounted on each of two end faces of the motor housing. Each bearing plate comprising at least one bearing. The motor shaft being rotatably mounted via said at least one bearings. At least one hydraulic pump comprises a drive shaft. A coupling connects the drive shaft to the motor shaft, whereby the drive shaft is driven by the electric motor. The motor housing includes a casing for receiving a cooling liquid. The casing is at least partially hollow and comprises a casing cavity. At least one connecting duct allows the cooling liquid to move between the casing cavity and at least one of said at least one bearings. The at least one hydraulic pump is mounted to the electric motor via a flange. The at least one hydraulic pump is sealed off in a liquid-tight manner with respect to interiors of the bearing plates.

The at least one rotating hydraulic pump may comprise one of an axial-piston pump, a radial-piston pump, a vane pump, and a gear pump. The at least one hydraulic pump may comprise two hydraulic pumps, each being arranged on opposite sides of the electric motor.

The electric motor may further comprise at least one of at least one inlet orifice and at least one outlet orifice. The electric motor may further comprise at least one inlet orifice and at least one outlet orifice, wherein the at least one inlet orifice is in fluid communication with a coolant reservoir and is connected to the casing cavity.

Each of the at least one inlet orifice and the at least one outlet orifice may be arranged on a cylindrical portion of the motor housing.

The electric motor may further comprise at least one of at least one inlet and at least one outlet, wherein at least one of the at least one inlet and the at least one outlet is arranged on at least one of the bearing plates.

The casing cavity may comprise at least three ducts through which the cooling liquid is capable of flowing. The at least three ducts may be arranged next to one another and are separated from one another only by partitions, whereby the cooling liquid can flow essentially through the entire casing cavity. The at least one connecting duct may comprises two connecting ducts, one connecting duct allowing cooling liquid to move between the casing cavity and one of said at least one bearings and another connecting duct allowing cooling liquid to move between the casing cavity and another of said at least one bearings.

The electric motor may further comprise at least one other connecting duct allowing cooling liquid to move from at least one of the at least one bearings to the casing cavity.

The at least one other connecting duct may be arranged in at least one of the bearing plates. The at least one other connecting duct may be arranged in each of the bearing plates. The casing cavity may comprise at least one axially running duct separated by partitions, the at least one axially running duct being in fluid communication with an inlet orifice and the at least one connecting duct, whereby cooling liquid can move between the inlet orifice and at least one of the bearing plates. The at least one axially running duct may comprise first and second axially running ducts separated by partitions and being arranged directly next to each other. The first axially running duct may be in fluid communication with one of the bearing plates and the second axially running duct may be in fluid communication with another of the bearing plates.

The at least one connecting duct may comprise first and second connecting ducts, the first connecting duct allowing cooling liquid to move between the casing cavity and one of said at least one bearings and the second connecting duct allowing cooling liquid to move between the casing cavity and another of said at least one bearings. The casing cavity may comprise a plurality of axially running ducts arranged next to one another, at least one of the ducts being connected to adjacent ducts in succession.

The casing cavity may further comprise at least one separating partition preventing fluid communication between adjacent axially running ducts.

The casing cavity may comprise a plurality of cooling ducts arranged in a meandering configuration, whereby at least some adjacent ducts are in fluid communication with each other. The casing cavity may comprise a plurality of axially arranged ducts and at least one separating partition preventing fluid communication between adjacent axially running ducts, wherein at least one of the plurality of ducts and at least one separating partition preventing fluid communication between adjacent axially running ducts, wherein at least one of the plurality of ducts is in fluid communication with one of the bearing plates and wherein at least another of the plurality of ducts is in fluid communication with another of the bearing plates. The at least one connecting duct may comprise two connecting ducts, each connecting duct being formed in each of the bearing plates and each allowing liquid coolant to flow into a respective interior of a respective bearing plate.

An interior of the motor housing within which windings of the electric motor are arranged, may be sealed off from the cooling liquid via at least one seal. The at least one seal may comprise a contactless seal. The at least one seal may comprise two seals, each being mounted to a respective bearing plate. At least one of the bearing plates may comprise a one-piece bearing plate that surrounds at least that part of the coupling.

The electric motor may further comprise a closing plate mounted to one of the bearing plates in a liquid-tight manner.

The electric motor may be adapted to use a cooling liquid that has reduced coefficient of friction. The coupling may be arranged in a location that receives the cooling liquid.

The electric motor may further comprise an adapter ring for connecting the at least one hydraulic pump to one of the bearing plates. Each of the adapter ring and the coupling may be adapted to be used with various types of hydraulic pumps.

The coupling may comprise a toothed sleeve.

The invention also provides for an electric motor of the type described above in combination with a device for cooling the cooling liquid. The device for cooling may comprise one of an oil heat exchanger and a water heat exchanger, whereby the device for cooling is arranged upstream of an entry point of the casing cavity. The combination may further comprise a device for filtering the cooling liquid arranged downstream of an exit point of the casing cavity.

The cooling fluid may comprise a hydraulic fluid that moves between the at least one hydraulic pump and the casing cavity. The cooling liquid may be stored in a common reservoir and moves between the at least one hydraulic pump, the casing cavity and the common liquid reservoir. The at least one hydraulic pump may be in fluid communication with the casing cavity, whereby the cooling fluid is fed from the at least one hydraulic pump to the casing cavity to provide cooling and/or lubricating to the electric motor.

The electric motor may further comprise another hydraulic pump, wherein the other hydraulic pump comprises a separate drive and is in fluid communication with the casing cavity, whereby the cooling fluid is fed from the other hydraulic pump to the casing cavity to provide cooling and/or lubricating to the electric motor.

The electric motor may further comprise feet for mounting the electric motor to a base. The feet may be arranged on the bearing plates.

The invention also provides for a method for cooling an electric motor having bearing plates and being coupled to a hydraulic pump, the method comprising feeding a cooling liquid through at least one cavity of a casing of the electric motor, directing the cooling liquid to bearings of the electric motor, wherein the bearings are cooled and lubricated with the cooling liquid in interior areas of the bearing plates, and providing sealing between the hydraulic pump and the electric motor, wherein the hydraulic pump is sealed off in a liquid-tight manner with respect to the interiors of the bearing plates.

The cooling liquid may flow in series first through a bearing plate mounted on one end face of a motor housing, then through a portion of the casing cavity, then through a bearing plate mounted on another end face of the motor housing, and thereafter through another portion of the casing cavity. The feeding may comprise feeding the cooling liquid through the casing cavity in a meander-shaped path.

The invention also provides for a liquid-cooled electric motor in combination with at least one hydraulic pump, wherein the at least one hydraulic pump comprises a drive shaft. The electric motor comprises a casing for receiving a cooling liquid, the casing being at least partially hollow and comprising a casing cavity, a motor shaft, a first bearing cover mounted on one end, a second bearing cover mounted on one end, each of the first and second bearing covers comprising a bearing and defining a interior chamber, a first connecting duct allowing cooling liquid to move between the casing cavity and one of the bearings, a second connecting duct allowing cooling liquid to move between the casing cavity and another of the bearings, and a mechanism for coupling the drive shaft to the motor shaft, whereby the drive shaft is driven by the electric motor. A first seal prevents the cooling liquid from moving between one interior chamber and an interior of the at least one hydraulic pump. Two second seals are included, each second seal preventing the cooling liquid from moving between a respective interior chamber and an internal portion of the electric motor. The at least one hydraulic pump is mounted to the electric motor.

The invention further provides for a method for cooling an electric motor having bearings and being coupled to a hydraulic pump, wherein the method comprises feeding a cooling liquid to a casing of the electric motor, moving the cooling liquid through at least one cavity of the casing, directing the cooling liquid to internal chambers surrounding bearings of the electric motor, providing a first sealing between the hydraulic pump and the electric motor, providing a second sealing at least between the one internal chamber and an interior of the electric motor, and allowing the cooling liquid to exist from the casing, wherein the cooling liquid moves between the internal chambers through the at least one cavity.

BRIEF DESCRIPTION OF THE DRAWINGS

The invention is described with reference to the exemplary, diagrammatic and nonrestrictive illustrations in FIG. 1 to FIG. 5. In the figures.

DETAILED DESCRIPTION OF THE INVENTION

Figure 1:
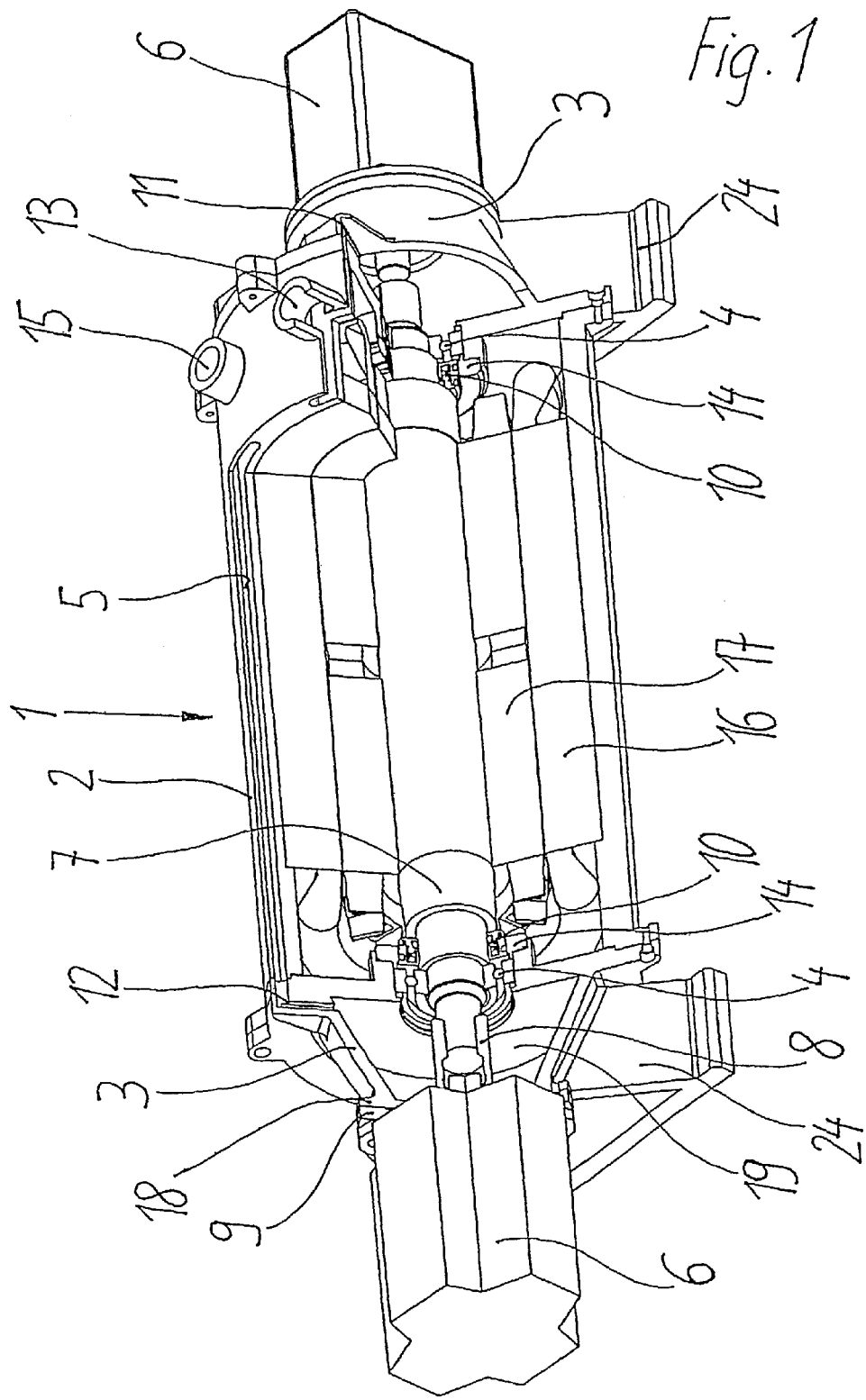
FIG. 1 shows a perspective sectional illustration of an electric motor according to the invention.
Figure 2:
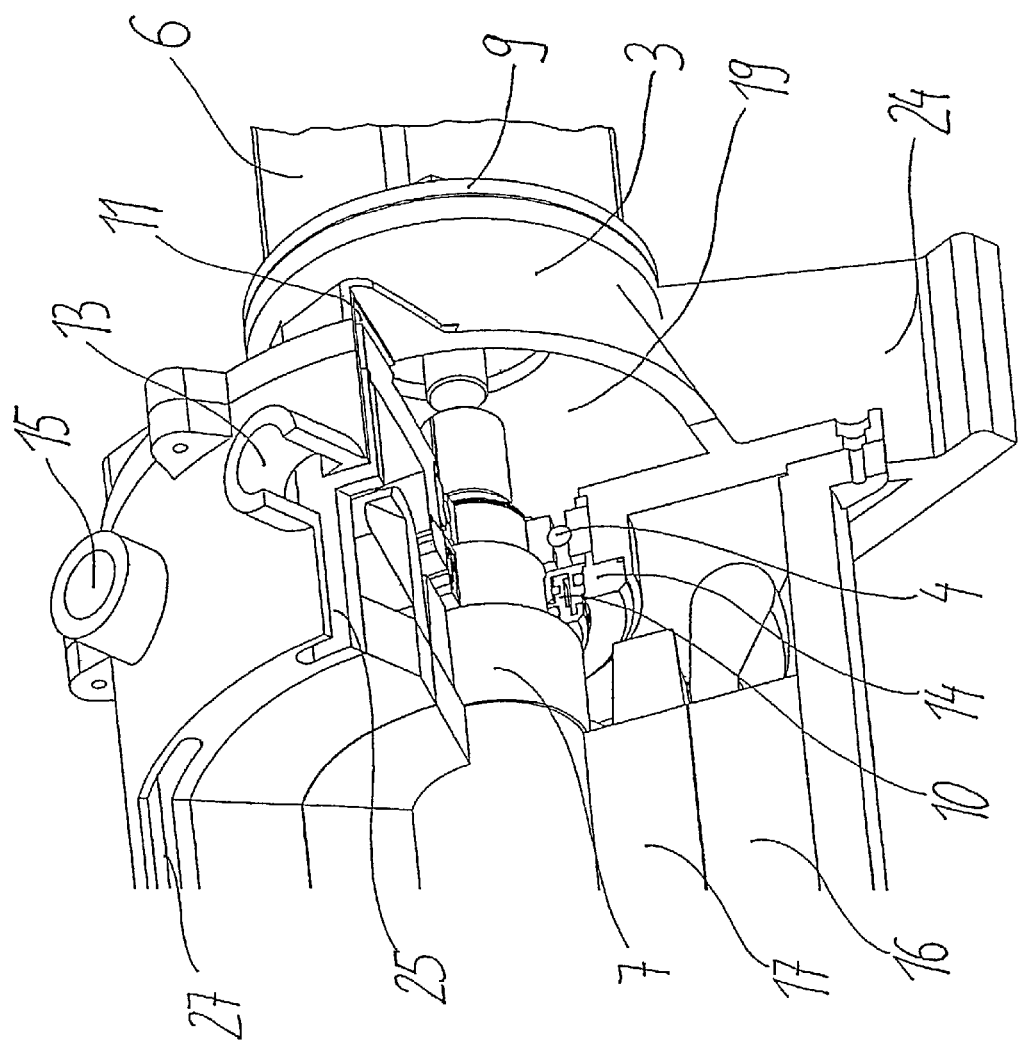
FIG. 2 shows an enlarged illustration of a bearing point of an electric motor according to the invention.

The invention is described below with reference to FIG. 1. The enlarged illustration in FIG. 2 serves for greater clarity.

The electric motor 1 with a stator 16, which is fastened to the inside of the motor housing 2, and with a rotor 17, which is fastened on the motor shaft 7, is located in a motor housing 2. Each side of the motor housing 2 has adjacent to it on the end face a bearing plate 3, in which a bearing 4 for the motor shaft 7 is held in each case. The bearings 4 are fixed in the bearing plates 3 in each case by way of a bearing holder 14. The bearing plates 3 are flush on the end face with a flange 18. Various types of hydraulic pumps 6 can be flanged on onto the electric motor 1 at these flanges 18 by way of different adapter rings 9. The hydraulic pumps 6 flanged on on both sides of the electric motor 1 are connected to the motor shaft 7 in each case via a coupling 8 and are therefore driven directly by the electric motor 1. In the present exemplary embodiment, the coupling 8 is designed as a toothed sleeve.

To cool the electric motor 1, the casing of the motor housing 2 has a hollow design and is subdivided into a plurality of throughflow ducts. This casing cavity 5 serves for receiving the cooling liquid which at the same time also serves as a lubricant for the bearings 4 and, if appropriate, also for the couplings 8. The cooling liquid is supplied into the casing cavity 5 via an inlet orifice 13. The cooling liquid exits at outlet orifice 15. Located on both sides of the electric motor 1, in the associated bearing plate 3, are a connecting duct 11 for the supply of cooling liquid into the bearing plate 3 and a connecting duct 12 for the discharge of cooling liquid from the bearing plate 3. The bearing plate interiors 19 are in this case filled completely with cooling liquid, and the bearings 4 and couplings 8 are consequently surrounded by cooling liquid which lubricates and simultaneously cools these. The cooling liquid is routed in the motor housing 2 via a duct system illustrated in FIG. 5.

The interior of the motor housing 2 itself is in this case sealed off relative to the cooling liquid by way of seals 10 which are located in the bearing holders 14, and this ensures that no cooling liquid can penetrate into the motor housing 2. The flanged-on hydraulic pumps 6 must likewise be sealed off in a liquid-tight manner with respect to the bearing plate interiors 19. Further, the connections between the flanges 18 of the bearing plates 3 and the adapter rings 9, the connections between the adapter rings 9 and the hydraulic pumps 6 and the connections between the bearing plates 3 and the motor housing 2 must be sealed off in a liquid-tight manner.

In this example, the bearing plates 3 are produced as castings and at the same time also form the feet 24 which carry the electric motor 1 and the hydraulic pumps 6 and by way of which the motor/pump assembly is fastened to a base.

The above description of an electric motor according to the invention is in no way restrictive. In particular, it is possible to configure the shape, number and position of the connecting ducts differently in structural terms or to use another type of coupling, such as, for example, a feather key connection. Moreover, the maximum number of hydraulic pumps capable of being flanged on on one side or on both sides of the electric motor depends only on the power of the electric motor.

Figure 3:
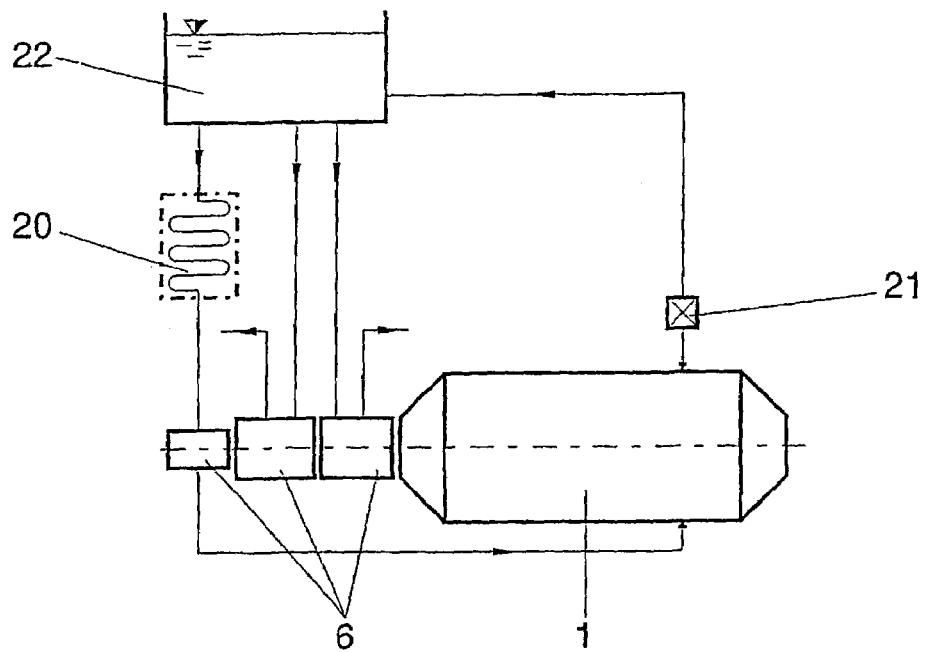
FIG. 3 and FIG. 4 each show a diagrammatic illustration of a cooling circuit.

As shown in FIG. 3, the cooling circuit of the electric motor 1 is maintained by way of one of the hydraulic pumps 6 which is flanged onto the electric motor 1 and is driven by the latter. The cooling liquid is in this case sucked in from a common liquid reservoir 22 and, for cooling the cooling liquid, is conveyed via a heat exchanger 20 into the electric motor 1. There, as described above, the cooling liquid arrives at the bearing points for lubrication and cooling. Thereafter, the cooling liquid is conveyed back into the liquid reservoir 22 again via a filter 21. This cooling circuit is designed in structural terms and in terms of delivery quantity, in such a way that the electric motor 1 can consequently be cooled during operation, without additional cooling devices.

Figure 4:
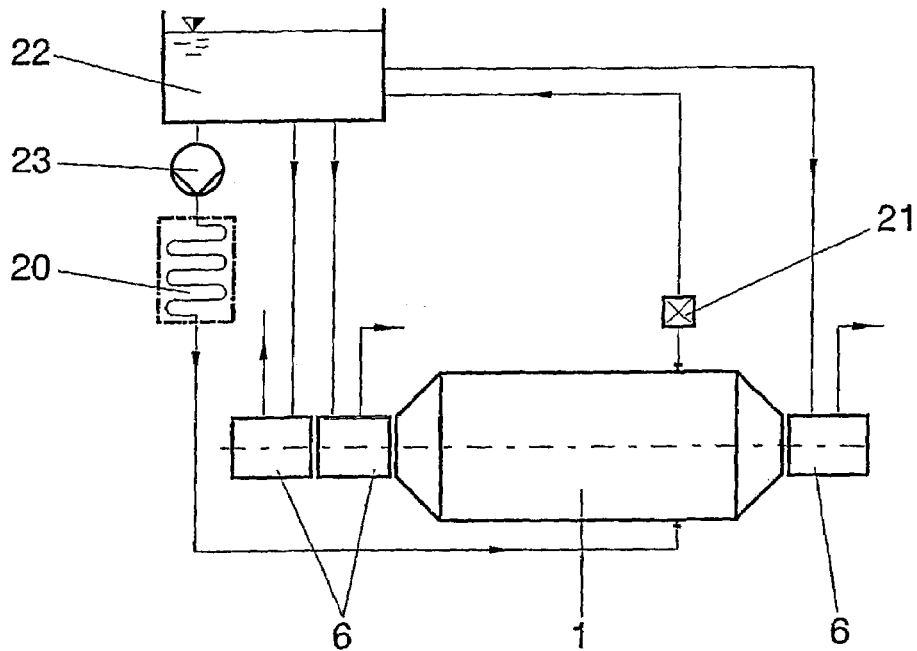

In FIG. 4, the cooling circuit is not operated by way of one of the hydraulic pumps 6 flanged onto the electric motor 1, but via a separate motor/hydraulic pump assembly 23. The path of the cooling liquid again leads from the liquid reservoir 22 via a heat exchanger 20 into the electric motor 1 and via a filter 21 back into the liquid reservoir 22 again.

The cooling circuit described is not restrictive. In particular, additional or other devices for cooling or filtering the cooling liquid may be provided, or different liquids and therefore necessarily also different liquid reservoirs may be used for the hydraulic circuits and for the cooling circuit.

Figure 5:
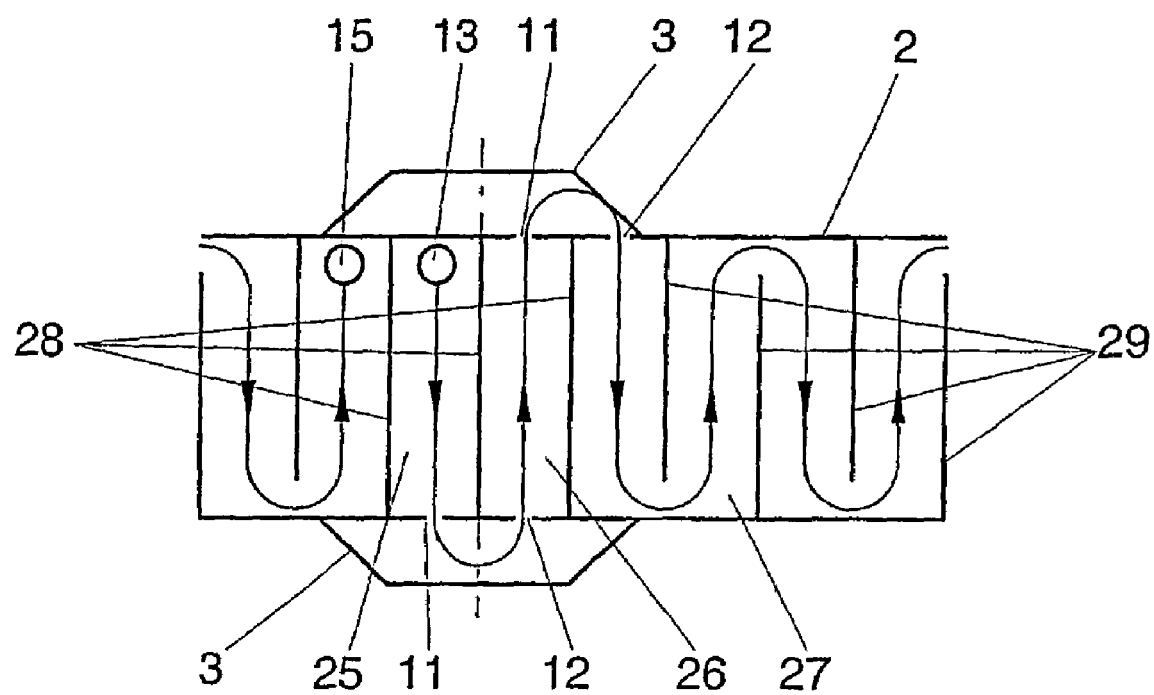
FIG. 5 shows a diagrammatic illustration of the rolled-up engine casing.

FIG. 5 shows the routing of the hydraulic fluid in the casing cavity 5 by way of an example. The hydraulic fluid in this case passes at the end of one side of the motor housing 2, via an inlet orifice 13, into a first axial duct 25 which is separated off by way of partitions 28 and through which it flows over the entire axial length of the motor housing 2. On the opposite side of the motor housing 2, the hydraulic fluid passes via a connecting duct 11 into the bearing plate 3 flanged on on this side and completely fills the bearing plate interior. The hydraulic fluid is discharged from the bearing plate 3 again via a second connecting duct 12, flows over the entire axial length of the motor housing 2 through a second axial duct 26 separated off by way of partitions 28 and passes on the opposite side of the motor housing 2, via a connecting duct 11, into the bearing plate 3 flanged on on this side and, in turn, completely fills the bearing plate interior. The hydraulic fluid is discharged from the bearing plate 3 again via a second connecting duct 12 and passes into a throughflow duct system 27, in which the hydraulic fluid is multiply deflected in the axial direction by way of deflecting walls 29 and thus flows through the entire remaining casing cavity 5. At the end of this duct system 27 is located an outlet orifice 15, through which the hydraulic fluid is discharged and is conveyed back to the liquid reservoir 22 in a further sequence, as described above.

In this nonrestrictive example, therefore, the hydraulic fluid flows successively through the bearing plates 3 and the entire casing of the motor housing 2. It would also be conceivable, however, to route the hydraulic fluid simultaneously through both bearing plates 3, to arrange the inlet 13 and outlet 15 orifices differently or to provide a plurality of inlet 13 and outlet 15 orifices. Further, it is conceivable to route the hydraulic fluid differently in the duct system 27, for example in the axial and/or radial direction. Further, it is natural, within the scope of the invention, for only part of the casing of the motor housing 2 to have a hollow design, as a result of which, of course, hydraulic fluid would also flow through only part of the casing of the motor housing 2. The hydraulic fluid can therefore be routed, as desired, through the casing of the motor housing 2 and the bearing plates, in each case the inlet 13 and outlet 15 orifices, the position of the connecting ducts 11, 12 in the bearing plates 3 and the ducts 25, 26 and 27 in the casing cavity 5 having to be adapted.

What is claimed is:

1. A liquid-cooled electric motor comprising:
   a motor shaft;
   a motor housing;
   a bearing plate mounted on each of two end faces of the motor housing;
   each bearing plate comprising at least one bearing;
   the motor shaft being rotatably mounted via each at least one bearing;
   at least one hydraulic pump comprising a drive shaft;
   a coupling connecting the drive shaft to the motor shaft, whereby the drive shaft is driven by the electric motor;
   the motor housing including a casing for receiving a cooling liquid;
   the casing being at least partially hollow and comprising a casing cavity;
   at least one connecting duct allowing cooling liquid to move between one at least one bearing and the casing cavity,
   wherein the at least one hydraulic pump is mounted to the electric motor via a flange, and
   wherein the at least one hydraulic pump is sealed off in a liquid-tight manner with respect to interiors of the bearing plates.

2. The electric motor of claim 1, wherein the at least one rotating hydraulic pump comprises one of an axial-piston pump, a radial-piston pump, a vane pump and a gear pump.

3. The electric motor of claim 1, wherein the at least one hydraulic pump comprises two hydraulic pumps, each being arranged on opposite sides of the electric motor.

4. The electric motor of claim 1, further comprising at least one of:
   at least one inlet orifice; and
   at least one outlet orifice.

5. The electric motor of claim 1, further comprising at least one inlet orifice and at least one outlet orifice, wherein the at least one inlet orifice is in fluid communication with a coolant reservoir and is connected to the casing cavity.

6. The electric motor of claim 5, wherein each of the at least one inlet orifice and the at least one outlet orifice is arranged on a cylindrical portion of the motor housing.

7. The electric motor of claim 1, further comprising at least one of:
   at least one inlet; and
   at least one outlet,
   wherein at least one of the at least one inlet and the at least one outlet is arranged on at least one of the bearing plates.

8. The electric motor of claim 1, wherein the casing cavity comprises at least three ducts through which the cooling liquid is capable of flowing.

9. The electric motor of claim 8, wherein the at least three ducts are arranged next to one another and are separated from one another only by partitions, whereby the cooling liquid can flow essentially through the entire casing cavity.

10. The electric motor of claim 1, wherein the at least one connecting duct comprises two connecting ducts, one connecting duct allowing cooling liquid to move between the casing cavity and the one at least one bearing and another connecting duct allowing cooling liquid to move between the casing cavity and another at least one bearing.

11. The electric motor of claim 1, further comprising at least one other connecting duct allowing cooling liquid to move from another at least one bearing to the casing cavity.

12. The electric motor of claim 11, wherein the at least one other connecting duct is arranged in at least one of the bearing plates.

13. The electric motor of claim 11, wherein the at least one other connecting duct is arranged in each of the bearing plates.

14. The electric motor of claim 1, wherein the casing cavity comprises at least one axially running duct separated off by partitions, the at least one axially running duct being in fluid communication with an inlet orifice and the at least one connecting duct, whereby cooling liquid can move between the inlet orifice and at least one of the bearing plates.

15. The electric motor of claim 14, wherein the at least one axially running duct comprises first and second axially running ducts separated by partitions and being arranged directly next to each other.

16. The electric motor of claim 15, wherein the first axially running duct is in fluid communication with one of the bearing plates and wherein the second axially running duct is in fluid communication with another of the bearing plates.

17. The electric motor of claim 16, wherein at least one connecting duct comprises first and second connecting ducts, the first connecting duct allowing cooling liquid to move between the casing cavity and the one at least one bearing and the second connecting duct allowing cooling liquid to move between the casing cavity and the other at least one bearing.

18. The electric motor of claim 1, wherein the casing cavity comprises a plurality of axially running ducts arranged next to one another, at least one of the ducts being connected to adjacent ducts in succession.

19. The electric motor of claim 18, wherein the casing cavity further comprises at least one separating partition preventing fluid communication between adjacent axially running ducts.

20. The electric motor of claim 1, wherein the casing cavity comprises a plurality of cooling ducts arranged in a meandering configuration, whereby at least some adjacent ducts are in fluid communication with each other.

21. The electric motor of claim 1, wherein the casing cavity comprises a plurality of axially arranged ducts and at least one separating partition preventing fluid communication between adjacent axially running ducts, wherein at least one of the plurality of ducts is in fluid communication with one of the bearing plates and wherein at least another of the plurality of ducts is in fluid communication with another of the bearing plates.

22. The electric motor of claim 1, wherein the at least one connecting duct comprises two connecting ducts, each connecting duct being formed in each of the bearing plates and each allowing liquid coolant to flow into a respective interior of a respective bearing plate.

23. The electric motor of claim 1, wherein an interior of the motor housing, within which windings of the electric motor are arranged, is sealed off from the cooling liquid via at least one seal.

24. The electric motor of claim 23, wherein the at least one seal comprises a contactless seal.

25. The electric motor of claim 23, wherein the at least one seal comprises two seals, each being mounted to a respective bearing plate.

26. The electric motor of claim 1, wherein at least one of the bearing plates comprises a one-piece bearing plate that surrounds at least that part of the coupling.

27. The electric motor of claim 1, further comprising a closing plate mounted to one of the bearing plates in a liquid-tight manner.

28. The electric motor of claim 1, wherein the electric motor is adapted to use a cooling liquid that has a reduced coefficient of friction.

29. The electric motor of claim 1, wherein the coupling is arranged in a location that receives the cooling liquid.

30. The electric motor of claim 1, further comprising an adapter ring for connecting the at least one hydraulic pump to one of the bearing plates.

31. The electric motor of claim 30, wherein each of the adapter ring and the coupling is adapted to be used with various types of hydraulic pumps.

32. The electric motor of claim 1, wherein the coupling comprises a toothed sleeve.

33. The electric motor of claim 1, in combination with a device for cooling the cooling liquid.

34. The combination of claim 33, wherein the device for cooling comprises one of an oil heat exchanger and a water heat exchanger, whereby the device for cooling is arranged upstream of an entry point of the casing cavity.

35. The combination of claim 34, further comprising a device for filtering the cooling liquid arranged downstream of an exit point of the casing cavity.

36. The electric motor of claim 1, wherein the cooling fluid comprises a hydraulic fluid that moves between the at least one hydraulic pump and the casing cavity.

37. The electric motor of claim 36, wherein the cooling liquid is stored in a common reservoir and moves between the at least one hydraulic pump, the casing cavity and the common liquid reservoir.

38. The electric motor of claim 1, wherein the at least one hydraulic pump is in fluid communication with the casing cavity, whereby the cooling fluid is fed from the at least one hydraulic pump to the casing cavity to provide cooling and/or lubrication to the electric motor.

39. The electric motor of claim 1, further comprising another hydraulic pump, wherein the another hydraulic pump comprises a separate drive which is in fluid communication with the casing cavity, whereby the cooling fluid is fed from the another hydraulic pump to the casing cavity to provide cooling and/or lubrication to the electric motor.

40. The electric motor of claim 1, further comprising feed for mounting the electric motor to a base.

41. The electric motor of claim 40, wherein the feet are arranged on the bearing plates.

42. A method for cooling the liquid-cooled electric motor of claim 1, the method comprising:
   connecting the at least one the hydraulic pump to the electric motor;
   removing the at least one hydraulic pump; and
   connecting another hydraulic pump to the electric motor.

43. A method for cooling the liquid-cooled electric motor of claim 1, the method comprising:
   connecting the at least one the hydraulic pump to the electric motor via one of the bearing plates,
   wherein the hydraulic pump is sealed off in a liquid-tight manner with respect to an interior of the one of the bearing plates.

44. A method of using the liquid-cooled electric motor of claim 1, the method comprising:
   connecting the at least one the hydraulic pump to the electric motor via one of the bearing plates; and
   running the electric motor without cooling fluid within a motor space,
   whereby the electric motor runs completely in air.

45. The electric motor of claim 1, wherein the at least one connecting duct comprises a first connecting duct allowing cooling liquid to move between the casing cavity and one of the bearings and a second connecting duct allowing cooling liquid to move between the casing cavity and another of the bearings, and further comprising a first seal for preventing the cooling liquid from moving between an interior chamber of one of the bearing plates and an interior of the at least one hydraulic pump and two second seals, wherein each second seal prevents the cooling liquid from moving between a respective interior chamber and an internal portion of the electric motor.

46. The electric motor of claim 1, wherein the at least one hydraulic pump is removably connected to the electric motor.

47. The electric motor of claim 1, wherein the at least one hydraulic pump is removably connected to one of the bearing plates.

48. The electric motor of claim 1, wherein the at least one hydraulic pump is removably connected to one of the bearing plates whereby another hydraulic pump can be connected to the one of the bearing plates.

49. The electric motor of claim 1, wherein the at least one hydraulic pump is removably connected to the electric motor, whereby another hydraulic pump can be connected to the electric motor.

50. A liquid-cooled electric motor comprising:
   a motor shaft;
   a motor housing;
   a bearing plate mounted on each of two end faces of the motor housing;
   each bearing plate comprising at least one bearing;
   the motor shaft being rotatably mounted via each at least one bearing;
   at least one hydraulic pump comprising a drive shaft;
   a coupling connecting the drive shaft to the motor shaft, whereby the drive shaft is driven by the electric motor;
   the motor housing including a casing for receiving a cooling liquid;
   the casing being at least partially hollow and comprising a casing cavity; and
   at least one connecting duct allowing cooling liquid to move between one at least one bearing and the casing cavity,
   wherein the at least one hydraulic pump is removably mounted to the electric motor via a flange, and
   wherein the at least one hydraulic pump is sealed off in a liquid-tight manner with respect to interiors of the bearing plates.

* * * * *